(12) United States Patent
Padgett

(10) Patent No.: US 7,206,782 B1
(45) Date of Patent: *Apr. 17, 2007

(54) METHOD FOR DERIVING A GRAZ SEISMIC ATTRIBUTE FILE

(76) Inventor: Michael John Padgett, 3709 Graustark St., Houston, TX (US) 77006

(*) Notice: Subject to any disclaimer, the term of this patent is extended or adjusted under 35 U.S.C. 154(b) by 446 days.

This patent is subject to a terminal disclaimer.

(21) Appl. No.: 10/721,983

(22) Filed: Nov. 25, 2003

Related U.S. Application Data

(60) Provisional application No. 60/443,351, filed on Jan. 29, 2003.

(51) Int. Cl.
*G06F 17/30* (2006.01)

(52) U.S. Cl. .......................... 707/10; 707/203; 707/101

(58) Field of Classification Search ................. 702/14, 702/16, 17; 707/1–10, 100–104.1, 200–205
See application file for complete search history.

(56) References Cited

U.S. PATENT DOCUMENTS

| | | | |
|---|---|---|---|
| 5,430,689 A | 7/1995 | Rigsby | 367/15 |
| 5,583,825 A | 12/1996 | Carrazzone | 367/31 |
| 5,930,730 A * | 7/1999 | Marfurt et al. | 702/16 |
| 6,131,071 A | 10/2000 | Partyka | 702/16 |
| 6,292,754 B1 * | 9/2001 | Thomsen | 702/14 |
| 6,401,042 B1 * | 6/2002 | Van Riel et al. | 702/17 |
| 6,463,387 B1 | 10/2002 | Runnestrand | 702/16 |
| 6,498,989 B1 * | 12/2002 | Pisetski et al. | 702/14 |
| 6,865,521 B1 | 7/2006 | Padgett | 703/2 |

* cited by examiner

*Primary Examiner*—Mohammad Ali
(74) *Attorney, Agent, or Firm*—Buskop Law Group, PC; Wendy Buskop

(57) ABSTRACT

The method for deriving a GrAZ seismic attribute file entails inputting a horizon file and an attribute file, obtaining the gradient of the horizon file thereby producing a horizon vector file, indexing from the attribute file data at corresponding geographic locations of the horizon file, forming an attribute file, obtaining the gradient of the attribute file thereby producing an attribute vector file, and performing a compilation of the horizon vector file and the attribute vector to ascertain if changes are in a direction towards a surface datum for a narrow time range and depth range and are detected and measured.

11 Claims, 4 Drawing Sheets

METHOD FOR DERIVING A GRAZ SEISMIC ATTRIBUTE FILE

The present application claims priority to co-pending U.S. Provisional patent application Ser. No. 60/443,351 filed on Jan. 29, 2003.

FIELD

The present invention relates to the generation of oil and gas exploration and production data attributes.

BACKGROUND

The goal of hydrocarbon exploration is to find porous and permeable geologic deposits containing high pore-space saturations of hydrocarbons, under sufficient pressure to allow some mode of commercial production. In pursuit of this goal, companies, countries and individuals collect and process many types of geophysical and geological data. The data is often analyzed to find anomalous zones that can reasonably be attributed to the presence of hydrocarbons.

The usage of 2D and 3D seismic data anomalies has been a standard practice in the petroleum industry since the 1960s. Other geologic and geophysical data anomalies have been tried, sometimes successfully, for over a century. These includes various gravimetric, electromagnetic, chemical, biological and speculative methods.

The usage of anomalies for oil and gas detection has been plagued by several problems. First, most remote sensing anomalies (e.g., a 3D seismic amplitude anomaly) cannot be directly tied to a rock property that could be measured in the laboratory or using well logs. Much effort is expended attempting to tie observed anomalies to known rock responses by modeling the expected attribute response or otherwise correlating with a known producing reservoir. This work is often based on the experience of the practitioner.

A second problem is that the anomalies themselves are often evaluated or tied to response models in a qualitative manner. With qualitative assessment as the basis, quantitative, objective and reproducible error analysis has not been possible.

A third problem is that a basic physical property at work is hydrocarbon reservoirs is that both oil and gas are less dense than water. This generally causes oil and gas to accumulate up-structure in the pore-space of potential reservoir rocks. The higher water saturations are found, generally, down-structure. This separation of saturations is driven by gravity. When such a separation of fluid types occurs, flat interfaces, in depth, are expected to form.

This separation causes numerous possible classes of data attribute response. First, the hydrocarbon reservoir will have one response for each hydrocarbon type. The water-saturated part of the reservoir may have a second data response and the interfacial area a third type of attribute data response. In this sequence of responses, neither the water saturated reservoir response nor the single component hydrocarbon saturated reservoir response are expected to vary with structural position. The transition from one type of fluid saturation to another, having a different density, is expected to occur at a single depth or seismic travel time within the attribute data set. This change from saturation state to another at a given depth and location should be detectable using a quantitative tool.

The present invention is designed for the detection, quantification and evaluation of the depth and location of interface between lighter and heavier saturating fluids as exhibited in a data attribute dataset. It is designed to quantify the change in a data attribute in the up structure direction from an interpreted water reservoir to the hydrocarbon reservoir part of the dataset. The invention has been designed to overcome these known problems in the art.

SUMMARY

The method for deriving a GrAZ seismic attribute file entails inputting horizon file data and, then, obtaining the gradient of the horizon file thereby producing a horizon vector file. The method next involves inputting attribute file data, indexing from the attribute file data at corresponding geographic locations of the horizon file, forming an attribute file, and obtaining the gradient of the attribute file thereby producing an attribute vector file. The method ends by performing a compilation of the horizon vector file and the attribute vector to ascertain if changes are in a direction towards a surface datum for a narrow time and depth range are detected and measured.

BRIEF DESCRIPTION OF THE DRAWINGS

A specific embodiment of the method will be described by way of example with reference to the accompanying drawings, in which.

Figure 1:
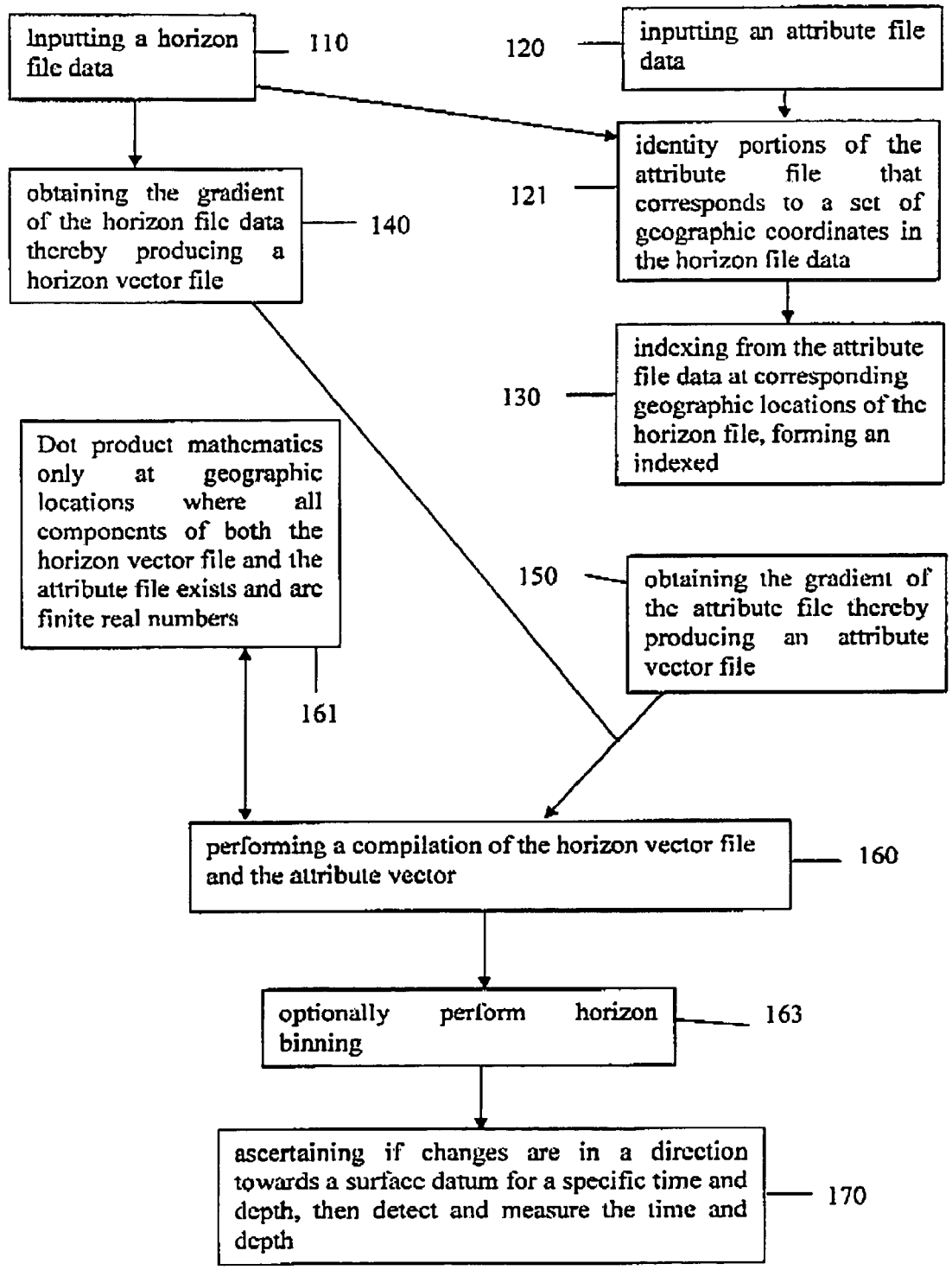
FIG. 1 is a diagram of the overall method.

The present method is detailed below with reference to the listed Figures.

DETAILED DESCRIPTION OF THE PREFERRED EMBODIMENTS

Before explaining the present method in detail, it is to be understood that the method is not limited to the particular embodiments and that it can be practiced or carried out in various ways.

The present method was conceived to detect the changes in a data attribute response in a data set associated with the change from a water reservoir to a hydrocarbon reservoir in a given area for a given geologic unit. In addition, the method was conceived to operate in high noise, low signal to noise environments, where the data quality is poor. The method was designed to operate on subtle hydrocarbon indicators. The method was also designed to characterize fully the isotropy of the water reservoir and of the hydrocarbon reservoir away from the interface between these reservoirs. Finally, the method was also conceived to determine the errors and uncertainties in all measurements and data attribute results relative to a given hydrocarbon reservoir and the corresponding water reservoir and the interfacial region.

The method addresses the case of multiple hydrocarbon zones, such as, gas over oil over water. It is designed to specifically test a model wherein gas is less dense than oil and oil is less dense than water, and data responses vary by structural position, but transition in a narrow range of depths or two-way seismic times. In a preferred embodiment, the narrow range would not exceed 5% of the total seismic two-way time or depth range contained within the horizon file.

Within a portion of the data attribute dataset, characterizing a single saturating fluid, this method is designed to verify that the data attribute response is invariant with respect to structural position. The quantification of this invariance and the associated uncertainty allow baselines to be established with respect to which the significance of an interfacial signal can be assessed.

This method is also designed to quantify responses and quantify response uncertainties in a manner that can be consistently defined, reported and replicated by others. Quantification and replication make the output of this method suitable for quantitative comparison with rock physics analyses, petro-physical analyses, response modeling and geologic analyses (e.g., fit to structure analysis). This quantification allows this method to be used in those cases where the hydrocarbon response is subtle and/or the signal to noise level is low. This combination of capabilities represents an advance over current methods.

The preferred embodiment is a method for computing a new data attribute for an area of interest. An area of interest means within the context of this patent application, either a geographic area for a hydrocarbon reservoir, an associated water reservoir, contiguous combinations of these or combinations of these with other reservoirs.

The preferred embodiment also relates to a method for deriving a GrAZ seismic attribute file. The method begins by inputting a horizon file and inputting an attribute file.

The attribute file and the horizon file must contain data elements at corresponding geographic coordinates. The geographic coordinates can be an X-Y prospect coordinate system, X-Y filed development system, latitude and longitude, internal 3D seismic survey coordinates, and combinations thereof. The data must be sufficiently continuous to allow the computation of a first derivative in each coordinate direction in each file, neglecting geographic edge effects.

The next step involves obtaining the gradient of the horizon file thereby producing a horizon vector file, having components, dH1 and dH2 at each location G. The first component, dH1, is the partial derivative of the horizon depth or seismic two-way time in the first coordinate direction at G. The second component, dH2, is the partial derivative of the horizon depth or seismic two-way time in the second coordinate direction at G.

The next step involves obtaining the gradient of the attribute file thereby producing an attribute vector file, having components, dAt1 and dAt2 at each location G. The first component, dAt1, is the partial derivative of the attribute value in the first coordinate direction at G. The second component, dAt2, is the partial derivative of the attribute value in the second coordinate direction at G.

The final step of the method involves performing a compilation of the horizon vector file and the attribute vector file to form a combined attribute file, GrAZ. The combined attribute file is studied to ascertain if observed changes in the attribute file are in a direction towards a surface datum for a narrow range of time and depth. If any components of either the horizon vector file or the attribute vector file do not exist or can not be computed at a location G, then no member of the combined attribute file, GrAZ exists at G or is assigned to the location G.

The method can further include the step of using dot product mathematics to perform the compilation. The dot product mathematics is a summation at each geographic location G of the product of corresponding elements of the horizon vector file and the attribute vector file at each geographic location G. The method of horizon binning can be determined by U.S. Pat. No. 6,865,521 "Method for Horizon Binning for an Area of Interest".

The method can further include the step of using dot product mathematics to perform the compilation. The dot product mathematics is a summation at each geographic location G of the product of corresponding elements of the horizon vector file and the attribute vector file at each geographic location G.

For example, if at a location G, the components of the horizon vector file are dH1 and dH2 and if at a location G, the components of the attribute vector file are dAt1 and dAt2, then the dot product is the sum of dH1 multiplied by dAt1 with dH2 multiplied by dAt2. If any of the quantities dH1, dH2, dAt1 or dAt2 do not exist or cannot be computed as finite real numbers at a location G, then a dot product is not performed and no element of the combined attribute file, GrAZ, exists at G or is assigned to the location G.

The method contemplates that the horizon file is a time horizon file made of a set of two-way seismic time values depicting the seismic travel time from the datum to the horizon of interest and back to a datum. In addition, the horizon file can be a depth horizon file made of a set of values that depict the depth from a datum to the horizon of interest within the Earth.

The attribute file in the method can one member of the following:
  a. a set of complied seismic reflection data processed using a defined attribute generating algorithm, and extracted for a horizon of interest;
  b. a set of complied seismic reflection data processed using a defined attribute generating algorithm in conjunction with a horizon of interest;
  c. a set of compiled seismic velocity data processed using a defined attribute generating algorithm and extracted for a horizon of interest;
  d. a set of compiled seismic velocity data processed using a defined attribute generating algorithm in conjunction with a horizon of interest;
  e. a set of geophysical gravity data extracted for a horizon of interest;
  f. a set of geophysical gravity data complied for a horizon of interest;
  g. a set of geophysical gravity data collected for a horizon of interest;
  h. a set of geophysical remote sensing data extracted for a horizon of interest;
  i. a set of geophysical remote sensing data complied for a horizon of interest;
  j. a set of geophysical gravity data collected for a horizon of interest;
  k. a set of complied geologic measurements for a horizon of interest;
  l. a set of collected geologic measurements for a horizon of interest;
  m. a set of petro-physical measurements for a horizon of interest;
  n. a set of complied or collected engineering data for a horizon of interest; and
  o. combinations thereof.

The method is better understood with reference to the Figures.

FIG. 1 is an overall schematic of the method for deriving a seismic attribute file. After the initial step of inputting horizon file data, (Step 110), the gradient of the horizon file data is obtained thereby producing a horizon vector file (Step 140). The other initial step of inputting attribute file data (Step 120) is followed by indexing from the attribute file data at corresponding geographic locations of the horizon file (Step 130). (Step 121) identifies portions of the attribute file that correspond to a set of geographic coordinates in the horizon file data. The product of this Step 121 is an attribute file at locations that correspond to similar locations in the horizon file data. The gradient of the attribute file data is then obtained producing an attribute vector file (Step 150). A compilation of the horizon vector file and the attribute vector file is performed (Step 160). Finally, from the compilation, it can be ascertained if measurable changes are in a direction towards a surface datum for a specific time and depth (Step 170). The specific time and depth can then be detected and measured. (Step 161) is dot product mathematics only at geographic locations where all components of both the horizon vector file and the attribute file exists and are finite real numbers. (Step 163) refers to an optional step of performing horizon binning usable with this method. Additionally, U.S. Pat. No. 6,865, 521 also issued to the same inventor. Michael Padgett on horizon binning is hereby incorporated by reference.

Figure 2:
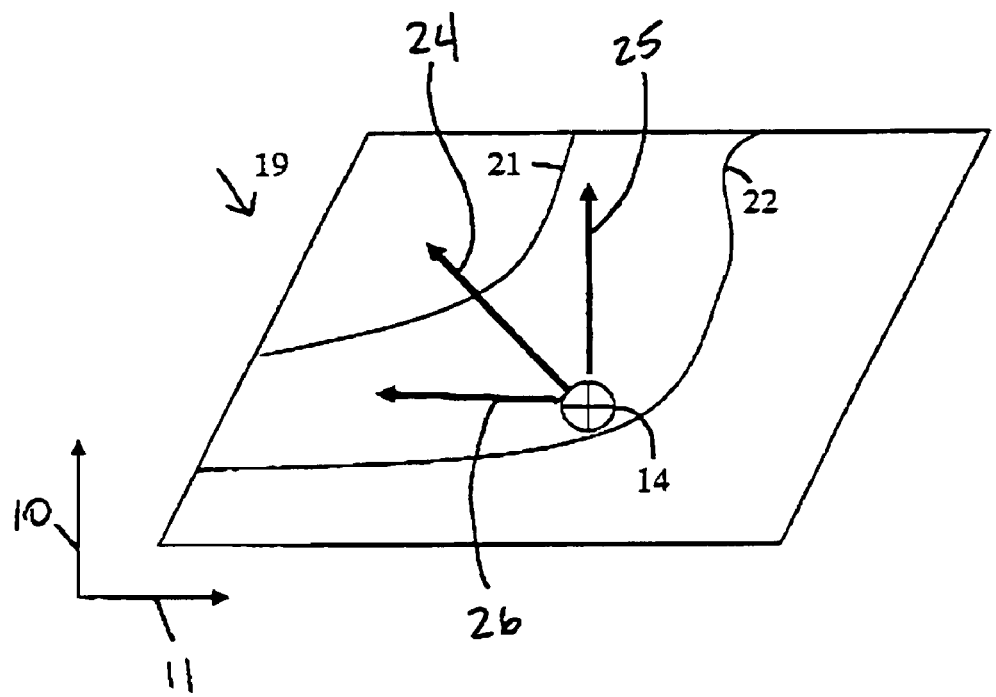
FIG. 2 depicts a geographic depiction of the horizon file within a large geographic area having structural contours.

FIG. 2 depicts a geographic depiction of the horizon file within a large geographic area 19 having structural contours 21 and 22. A geographic location G is depicted by element 14. At geographic location G, a gradient vector is derived from a horizon file for the large geographic area 19 and is depicted as element 24. The horizon gradient vector 24 has two components, dH1 is element 25 and dH2 is element 26.

The first component, dH1, element 25, is the partial derivative of the horizon depth or seismic two-way travel time in the first coordinate direction at geographic location G. The second component, dH2, element 26, is the partial derivative of the horizon depth or seismic two-way travel time in the second coordinate direction at geographic location G.

Element 10 depicts the first coordinate direction and element 11 depicts the second coordinate direction. It is assumed that the coordinate system is orthogonal in a preferred embodiment.

The axis set illustrates the two coordinate directions and applies to both the horizon file and the attribute file.

Figure 3:
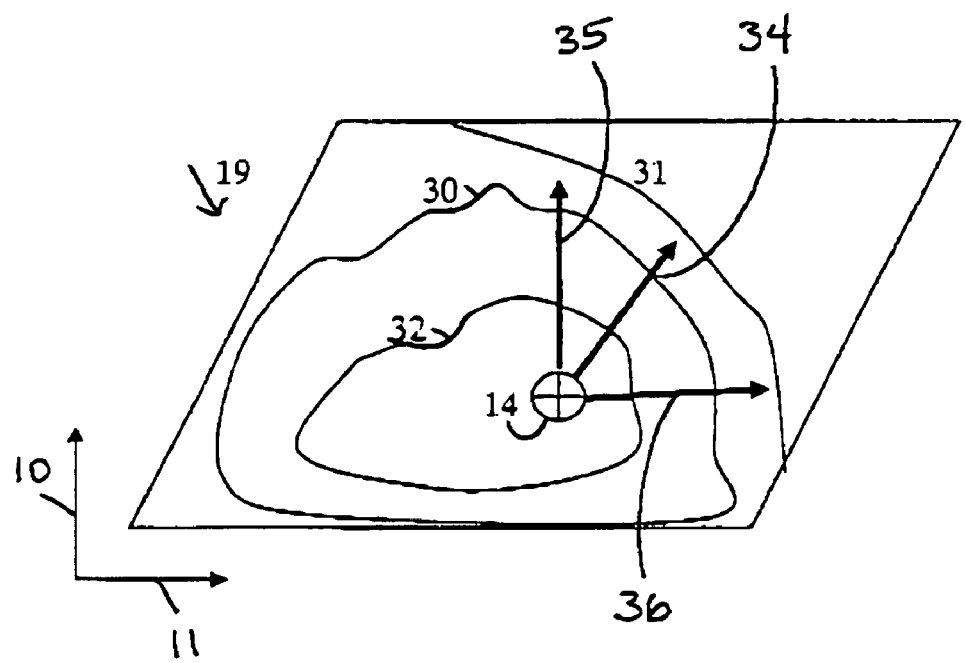
FIG. 3 depicts the area of the attribute file containing attribute contours.

Further, FIG. 3 depicts the area 19 of the attribute file containing attribute contours 30, 31 and 32. The geographic location, G an attribute gradient vector 34 is derived from an attribute file for the large geographic area 19.

The attribute gradient vector 34 has two components, dAt1 shown as element 35 and dAt2 shown as element 36. The first component 35, dAt1, is the partial derivative of the attribute file in the first coordinate direction at G, shown in FIG. 2. The second component 36, dAt2, is the partial derivative of the attribute file in the second coordinate direction at G, shown in FIG. 2.

As an example of compilation, the dot product at geographic location G is formed by adding (dH1 multiplied by dAt1) to (dH2 multiplied by dAt2). If any of the quantities dH1, dH2, dAt1 or dAt2 do not exist or can not be computed as finite real numbers at a geographic location G, then no dot product is performed and no element of the combined attribute file, gradient attribute depth (which phrase is referred to herein as "GrAZ"), exists or is assigned to the geographic location G. This method of computation is a standard mathematical dot product of two vectors at a geographic G. The set of all such dot products successfully computed over the area 19 is geographically indexed to form the combined attribute file, GrAZ.

Figure 4:
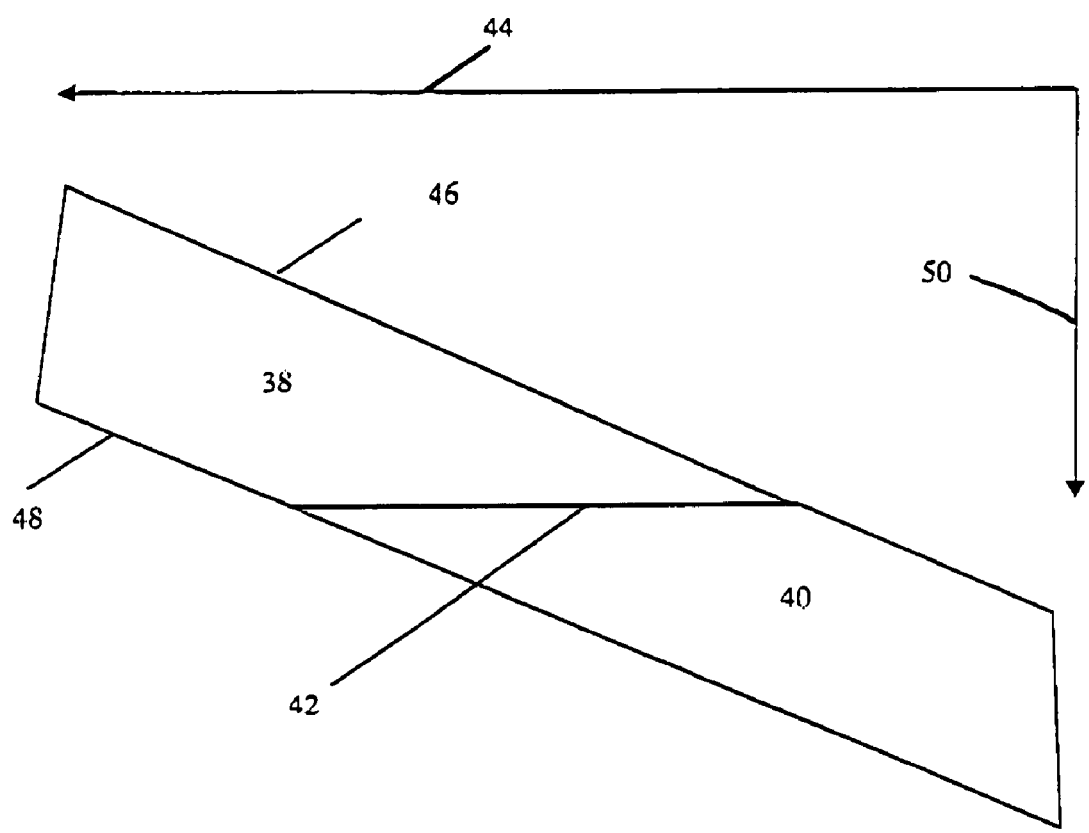
FIG. 4 depicts the hydrocarbon reservoir interface with a water reservoir.

FIG. 4 depicts the geometry of a hydrocarbon reservoir 38, a water reservoir 40 and the interface 42 between the hydrocarbon reservoir 38 and the water reservoir 40. It is also possible that water reservoir 40 could be a hydrocarbon reservoir and if that is the case then hydrocarbon reservoir 38 can be a lighter hydrocarbon reservoir as compared with the reservoir 40.

The datum surface 44 is the datum from which all depths and times are measured. Element 50 indicates the direction of increasing depth and/or increasing seismic two-way travel time as measured from the datum surface 44.

In FIG. 4, a top surface 46 gives the bounds the hydrocarbon/water reservoirs 38 and 40. The bottom surface 48 gives the lower bounds of the hydrocarbon/water reservoirs 38 and 40 respectively.

Top surface 46 or bottom surface 48 may serve as a typical horizon of interest. The horizon of interest may be any surface defined to be a surface expressible as a one-to-one function of either (or both) the top surface 46 or the bottom surface 48.

The geologic region of proposed high water saturation and minimal or no productive hydrocarbon saturation 40 is shown in FIG. 4. The interface 42 divides the two geological regions, 38 and 40. The interface 42 is normally expected to be flat with respect to the depth or seismic two-way travel time axis.

Figure 5:
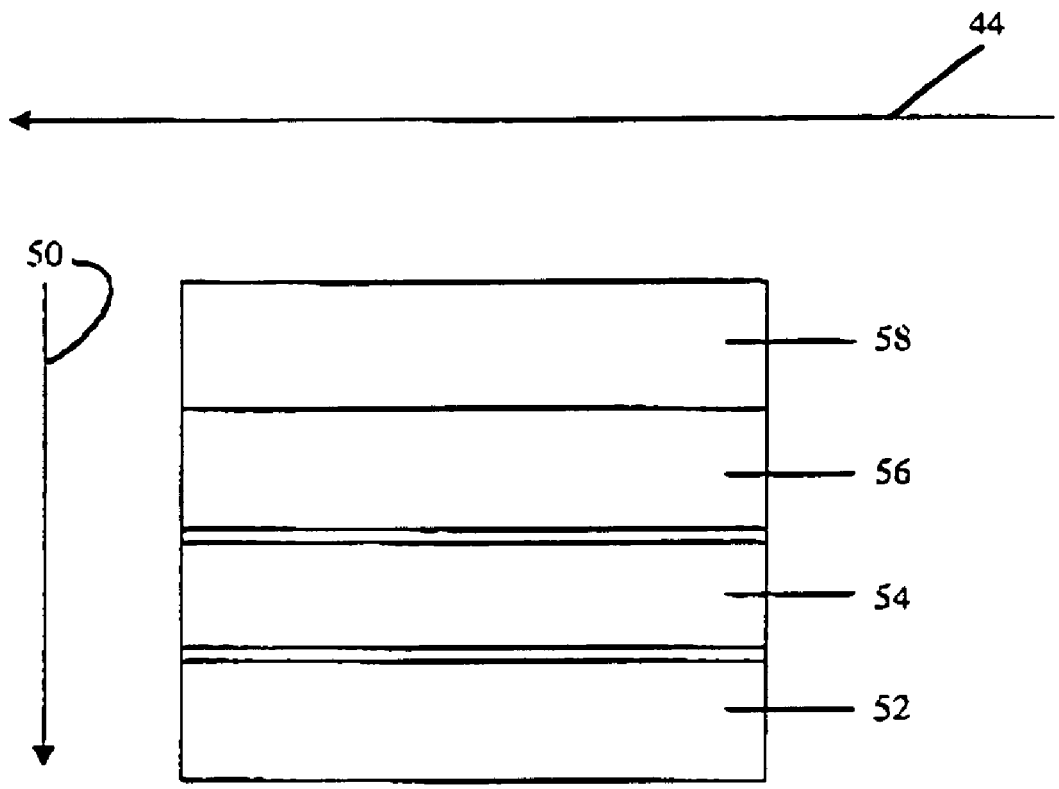
FIG. 5 depicts the interface as a plurality of hydrocarbon reservoir types and water reservoirs separated by interfaces.

FIG. 5 depicts the interface as a plurality of hydrocarbon reservoir types and water reservoirs separated by interfaces. The interface is shown with respect to a depth or time axis 50 which indicates the direction of increasing depth and/or increasing seismic two way travel time from a surface datum 44.

The bottom layer 52 is predominantly a water reservoir containing a high water saturation and minimal or no productive hydrocarbon saturation. The adjacent layer 54 is a hydrocarbon reservoir containing a high hydrocarbon saturation of a type that is less dense than the saturating fluid(s) in the bottom layer 52.

The middle layer 56 is another hydrocarbon reservoir containing a high hydrocarbon saturation of a type that is less dense than the saturating fluid(s) in the adjacent layer 54.

The top layer 58 is a hydrocarbon reservoir containing a high hydrocarbon saturation of a type that is less dense than the saturating fluid(s) in the middle layer 56.

It should be noted that FIG. 5 is only one embodiment that this method can analyze, and various reservoirs can form specific layers of the form shown as 52, 54, 56 and 58.

In discussing this method, several terms require consistent definition. The water reservoir is a geologic rock formation having both porosity and permeability and saturated primarily by water. The water formation may contain a partial hydrocarbon saturation, but at a sufficiently low level so as to preclude economic development.

Similarly, the hydrocarbon reservoir is a geologic rock formation having both porosity and permeability and saturated in most cases by a combination of water and hydrocarbons. The saturation of hydrocarbons must be sufficiently high so as to allow economic development. If the saturation of hydrocarbons does not allow the production of hydrocarbons and associated water is quantities that are commercial, the reservoir would not be called a hydrocarbon reservoir. Typically, the hydrocarbon reservoir is found up-structure of the water reservoir, which is located down-structure. In this discussion, up-structure refers to shallower depths from the surface within the earth. Down-structure refers to deeper depths within the earth. In the case of seismic travel times, deeper depths correspond to larger absolute value seismic travel times and shallower depths to smaller absolute value travel times.

Both depths and seismic travel times are typically measured from a specified datum. The datum is a specified surface to which measurements are referenced. For example, in offshore exploration and production, the datum is typically taken to be mean sea level. Depths or seismic times are then referenced to mean sea level as the datum.

While this method has been described with emphasis on the preferred embodiments, it should be understood that within the scope of the appended claims, the method might be practiced other than as specifically described herein.

What is claimed is:

1. A method for deriving a seismic attribute file executed by a computer system, comprising the steps of:
   a. inputting a horizon file data;
   b. inputting attribute file data wherein the attribute file data are selected from the group consisting of:
      i. a set of compiled seismic reflection data processed using a defined attribute generating algorithm, and extracted for a horizon of interest;
      ii. a set of compiled seismic reflection data processed using a defined attribute generating algorithm in conjunction with a horizon of interest;
      iii. a set of compiled seismic velocity data processed using a defined attribute generating algorithm and extracted for a horizon of interest;
      iv. a set of compiled seismic velocity data processed using a defined attribute generating algorithm in conjunction with a horizon of interest;
      v. a set of geophysical gravity data extracted for a horizon of interest;
      vi. a set of geophysical gravity data compiled for a horizon of interest;
      vii. a set of geophysical gravity data collected for a horizon of interest;
      viii. a set of geophysical remote sensing data extracted for a horizon of interest;
      ix. a set of geophysical remote sensing data compiled for a horizon of interest;
      x. a set of geophysical gravity data collected for a horizon of interest;
      xi. a set of compiled geologic measurements for a horizon of interest;
      xii. a set of collected geologic measurements for a horizon of interest;
      xiii. a set of petro-physical measurements for a horizon of interest;
      xiv. a set of compiled or collected engineering data for a horizon of interest; or
      xv. combinations thereof;
   c. indexing from the attribute file data at corresponding geographic locations of the horizon file, forming an attribute file;
   d. obtaining the gradient of the horizon file data thereby producing a horizon vector file;
   e. obtaining the gradient of the attribute file thereby producing an attribute vector file; and
   f. performing a compilation of the horizon vector file and the attribute vector file to ascertain if attribute changes in a direction towards a surface datum for a narrow time and depth range are detected and measured, wherein the narrow range is less than 5% of the total time or depth range contained within the horizon file.

2. The method of claim 1, wherein after the compilation is performed, horizon binning is performed.

3. The method of claim 1, wherein the step of inputting of the attribute file data is performed by identifying portions of the attribute file that corresponds to a set of geographic coordinates in the horizon file data.

4. The method of claim 3, wherein the geographic coordinates are selected from the group consisting of:
   a. X-Y prospect coordinate system;
   b. X-Y field development system;
   c. latitude and longitude;
   d. internal 3D seismic survey coordinates; and
   e. combinations thereof.

5. The method of claim 4, wherein the geographic coordinates further comprises corresponding uncertainties.

6. The method of claim 1, wherein the horizon file data is a time horizon file comprising a set of two-way seismic time values depicting the seismic travel time from the datum to the horizon of interest and back to a datum.

7. The method of claim 1, wherein the horizon file data is a depth horizon file comprising a set of values which depict the depth from a datum to the horizon of interest.

8. The method of claim 1, further comprising the step of wherein one method of compilation is performed using dot product mathematics.

9. The method of claim 8, wherein the dot product mathematics is a summation at each geographic location G of the product of corresponding elements of the horizon vector file and the attribute vector file at each geographic location G.

10. The method of claim 8, wherein the compilation is performed only at geographic location G where all components of both the horizon vector file and the attribute vector file exist and are finite real numbers.

11. The method of claim 1, wherein the step of indexing occurs by compiling both the horizon file data and the attribute file data in such a way that both files are described using the same geographic locations G.

* * * * *